United States Patent [19]

Asano et al.

[11] Patent Number: 5,994,499
[45] Date of Patent: Nov. 30, 1999

[54] GRANULATED POWDER OF POLYTETRAFLUOROETHYLENE FOR MOLDING AND PROCESS FOR THE PRODUCTION THEREOF

[75] Inventors: Michio Asano; Shingo Tanigawa; Tetsuo Shimizu; Shoji Kawachi, all of Settsu, Japan

[73] Assignee: Daikin Industries, Ltd., Osaka, Japan

[21] Appl. No.: 09/068,123

[22] PCT Filed: Nov. 5, 1996

[86] PCT No.: PCT/JP96/03238

§ 371 Date: May 7, 1998

§ 102(e) Date: May 7, 1998

[87] PCT Pub. No.: WO97/17893

PCT Pub. Date: May 15, 1997

[30] Foreign Application Priority Data

Nov. 5, 1996 [JP] Japan .................................. 7-291175

[51] Int. Cl.⁶ ...................................................... C08J 3/12
[52] U.S. Cl. ..................... 528/502 R; 528/499; 528/500; 528/501; 528/502 F; 524/546; 524/805; 425/222
[58] Field of Search ..................................... 524/546, 805; 528/499, 500, 501, 502 F; 425/502 R, 222

[56] References Cited

U.S. PATENT DOCUMENTS

| 3,345,683 | 10/1967 | Eirich et al. | 425/222 |
|---|---|---|---|
| 3,674,241 | 7/1972 | Eirich et al. | 259/15 |
| 3,882,217 | 5/1975 | Banham et al. | 264/117 |
| 4,143,110 | 3/1979 | Morozumi et al. | 264/117 |
| 4,611,922 | 9/1986 | Eirich | 366/221 |

FOREIGN PATENT DOCUMENTS

| 0 432 718 | 6/1991 | European Pat. Off. . |
|---|---|---|
| 0 708 131 | 4/1996 | European Pat. Off. . |
| 1 416 419 | 1/1966 | France . |
| 3-259926 | 11/1991 | Japan . |
| 4-185647 | 7/1992 | Japan . |
| 4-218534 | 8/1992 | Japan . |
| 3-259925 | 11/1992 | Japan . |
| 95/18067 | 7/1995 | WIPO . |

OTHER PUBLICATIONS

Manfred H. Pahl, *"Mischen beim Herstellen und Verarbeiten von Kunststoffen"*, 1986, pp. 166–167. (No translation).

*Primary Examiner*—Andrew E. C. Merriam
*Attorney, Agent, or Firm*—Armstrong, Westerman, Hattori, McLeland & Naughton

[57] ABSTRACT

To provide a polytetrafluoroethylene granular powder for molding and a process for preparing the granular powder, in which the granular powder contains only a small number of coarse particles, is obtained with good tumbling efficiency and further no organic liquid is required to be used. The process is for preparing a polytetrafluoroethylene granular powder for molding by granulating a polytetrafluoroethylene powder through tumbling with a granulator having a rotating inclined disc and a rotating side plate; characterized in that the granulator:

(1) comprises a disc inclined to a horizontal level and a side plate provided on the periphery of the disc,
(2) has the side plate assembled in one unit with the disc and rotating together, and
(3) is equipped with an agitator positioned eccentrically to the center of a vortex of the polytetrafluoroethylene powder which is caused by tumbling, or the granulator:

(1) comprises a disc inclined to a horizontal level and a side plate provided on the periphery of the disc,
(2) has the side plate separated from the disc and being rotatable around the periphery of the disc, and
(3) is equipped with an agitator positioned eccentrically to the center of a vortex of the polytetrafluoroethylene powder which is caused by tumbling, and that the granulation is carried out by tumbling the polytetrafluoroethylene powder wetted with an aqueous solution containing a surfactant.

20 Claims, 3 Drawing Sheets

FIG. 1

1 Granulator with Rotating Disc and Side Plate
2 Disc
3 Side Plate
4 Agitator

FIG. 2

2   Disc
3   Side Plate
4   Agitator

FIG. 3

| 11 | Rotating Disc Type Granulator | 14 | Chopper Blade |
| 12 | Rotating Disc | 15 | Pulverizer |

FIG. 4

| 11 | Rotating Disc Type Granulator | 14 | Chopper Blade |
| 12 | Rotating Disc | 15 | Pulverizer |

GRANULATED POWDER OF POLYTETRAFLUOROETHYLENE FOR MOLDING AND PROCESS FOR THE PRODUCTION THEREOF

TECHNICAL FIELD

The present invention relates to a polytetrafluoroethylene granular powder for molding and a preparation process thereof.

BACKGROUND ART

Hitherto a process for granulating a polytetrafluoroethylene granular powder for molding by using an organic liquid and tumbling a powder has been proposed. For example, JP-B-45-9071 discloses a process for tumbling a powder while heating the powder, JP-B-44-22620 discloses a process for granulating by tumbling for obtaining a filler-containing PTFE granular powder, and JP-B-46-14535 discloses a process for granulating by tumbling with a pan type pelletizer.

However, the processes disclosed in those publications have problems such that an organic liquid used is inflammable and harmful to human body and further that equipment cost for carrying out the processes becomes high.

An object of the present invention is to provide a polytetrafluoroethylene granular powder for molding, which contains only a small amount of coarse particles, and a process for preparing the granular powder at high yield with good tumbling efficiency without necessity of using an organic liquid.

DISCLOSURE OF THE INVENTION

The present invention relates to a process for preparing a polytetrafluoroethylene granular powder for molding by granulating a polytetrafluoroethylene powder through tumbling with a granulator having a rotating disc and a rotating side plate; characterized in that the granulator:

(1) comprises a disc inclined to a horizontal level and a side plate provided on the periphery of the disc,
(2) has the side plate assembled in one unit with the disc and rotating together, and
(3) is equipped with an agitator positioned eccentrically to the center of a vortex of the polytetrafluoroethylene powder which is caused by tumbling, and that the granulation is carried out by tumbling the polytetrafluoroethylene powder wetted with an aqueous solution containing a surfactant.

Also the present invention relates to a process for preparing a polytetrafluoroethylene granular powder for molding by granulating a polytetrafluoroethylene powder through tumbling with a granulator having a rotating disc and a rotating side plate; characterized in that the granulator:

(1) comprises a disc inclined to a horizontal level and a side plate provided on the periphery of the disc,
(2) has the side plate separated from the disc and being rotatable around the periphery of the disc, and
(3) is equipped with an agitator positioned eccentrically to the center of a vortex of the polytetrafluoroethylene powder which is caused by tumbling, and that the granulation is carried out by tumbling the polytetrafluoroethylene powder wetted with an aqueous solution containing a surfactant.

Further the present invention relates to a polytetrafluoroethylene granular powder for molding which is obtained by any of the above-mentioned processes and characterized in that an apparent density of the granular powder is not less than 0.6 g/ml, flowability of the granular powder is not less than 6 times and an average particle size of particles in the granular powder is from 400 to 1,000 μm.

BEST MODE FOR CARRYING OUT THE INVENTION

A major feature of the preparation process of the present invention is to tumble a powder by using a specific granulator.

In this specification the tumbling means that polytetrafluoroethylene (PTFE) particles rotate and move around while being rubbed with each other or brought into contact to inner surfaces of the side plate of the granulator.

Figure 1:
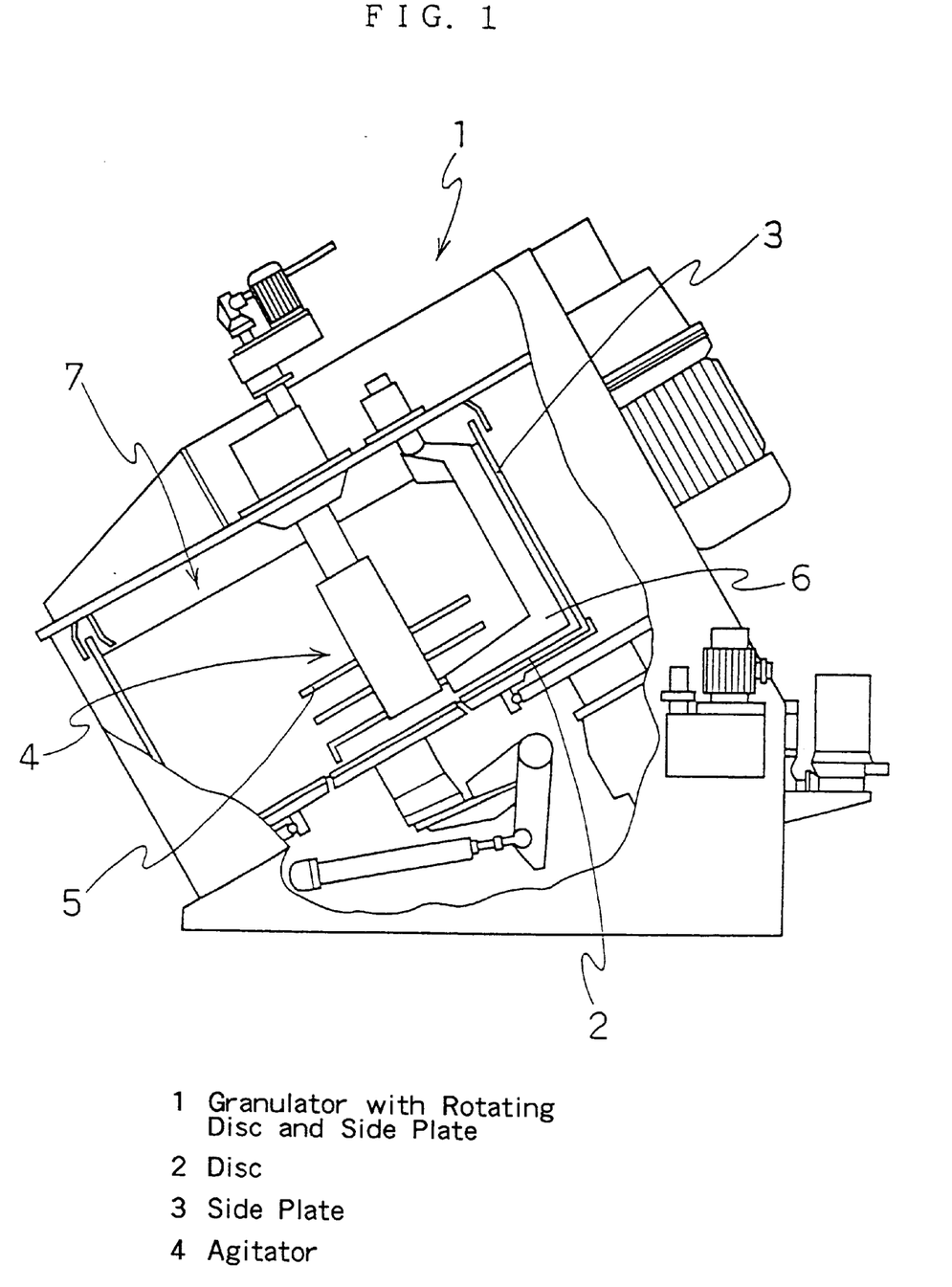
FIG. 1 is a cross-sectional and partly broken view for explaining the granulator with a rotating inclined disc and a rotating side plate, which is used in Experimental Examples 1 to 4.

In FIG. 1, numeral 1 represents a granulator with a rotating inclined disc and a rotating side plate, which comprises the inclined disc 2, side plate 3, agitator 4 having agitator blades and wall scraper 6.

Examples of such a granulator are, for instance, Irich Reverse Flow Type High Speed Mixer Model R02 and R08W available from Nippon Irich Co., Ltd., and the like.

FIG. 1 is a cross-sectional and partly broken view for explaining a specific granulator (namely a granulator with a rotating inclined disc and a rotating side plate) used in the present invention.

In FIG. 1, the disc 2 is inclined to a horizontal level. For example, an angle of the disc 2 to a horizontal level is so set as to be from 10 to 40 degrees, preferably from 20 to 30 degrees in that only coarse particles can be pulverized.

The side plate 3 is formed into one unit with the disc 2 and can rotate together with the disc 2. In the present invention, the side plate 3 may be separated from the disc 2 and be capable of rotating around the periphery of the disc 2.

As mentioned above, since the side plate 3 also rotates, an area necessary for tumbling the PTFE powder is large, and as a result, the process of the present invention has a good tumbling efficiency.

The peripheral speed of the disc 2 and side plate 3 which are formed into one unit is from 5 to 20 m/second, preferably from 5 to 10 m/second from the viewpoint of carrying out the tumbling efficiently.

When the disc 2 is separated from the side plate 3, rotational direction and peripheral speed of them are, for example, as follows.

When the both are rotating in the same direction, the peripheral speed of the disc is from 5 to 20 m/second, preferably from 5 to 10 m/second. The peripheral speed of the side plate is from 5 to 20 m/second, preferably from 5 to 10 m/second.

When the both are rotating in the opposite directions, the peripheral speed of the disc is from 5 to 20 m/second, preferably from 5 to 10 m/second. The peripheral speed of the side plate is from 5 to 20 m/second, preferably from 5 to 10 m/second. Thus excellent tumbling efficiency is obtained.

The agitator 4 is positioned eccentrically to the center of the vortex which arises when tumbling the PTFE powder. At the time of tumbling, since there is a tendency that particles having a smaller particle size move downward in the granulator and particles having a larger particle size (coarse particles) move upward, the agitator blades 5 supported on the agitator 4 function to pulverize the coarse particles.

The wall scraper 6 is fixed inside a granulation tank 7, and functions to disturb, to the desired degree, a flow of the PTFE powder which occurs by the rotation of the agitator 4 and side plate 3, thereby bringing the particles of the PTFE powder into contact with each other more easily.

Figure 2:
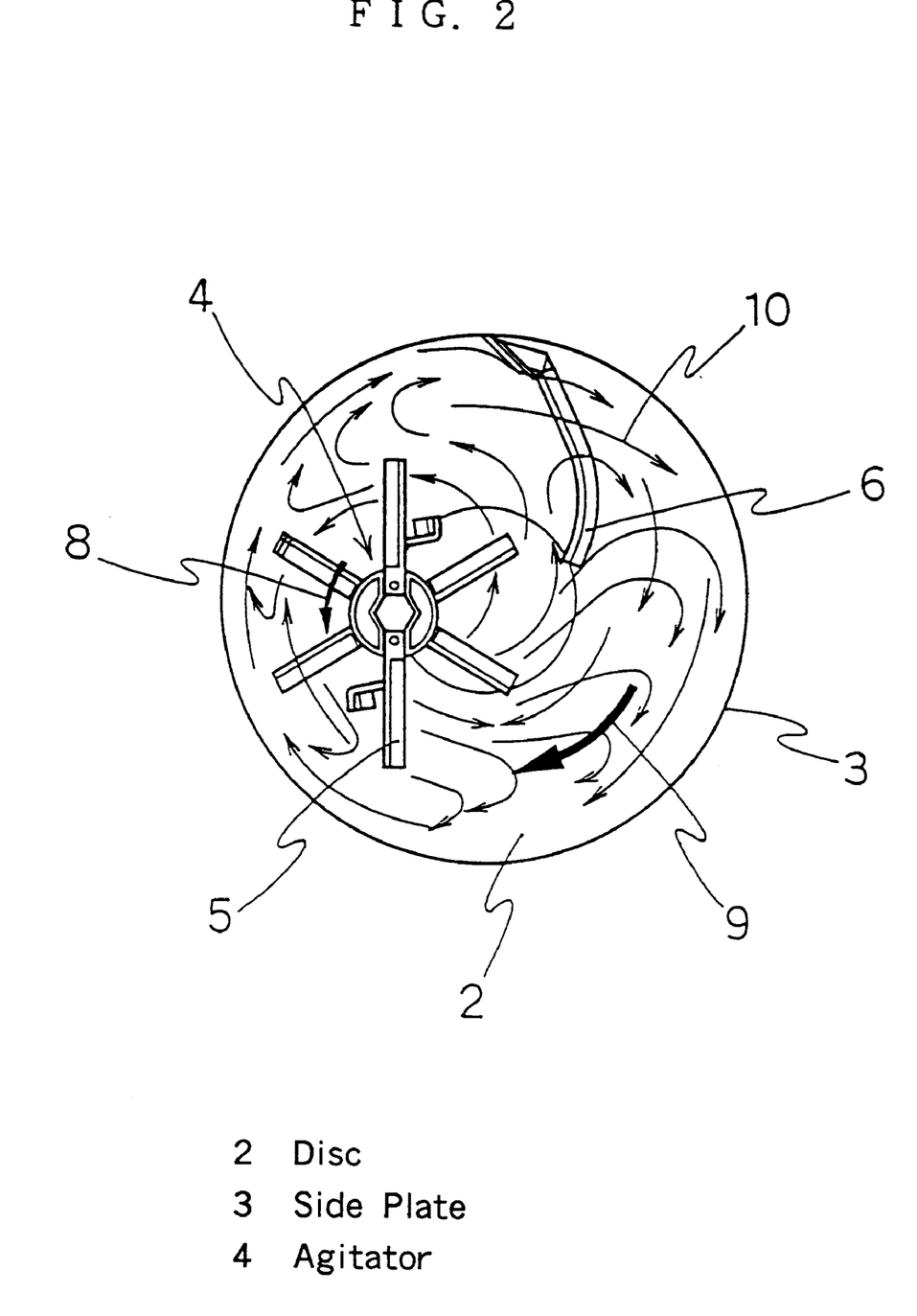
FIG. 2 is a diagrammatical view when looking, from above, inside of the granulator with a rotating inclined disc and a rotating side plate, which is used in Experimental Examples 1 to 4.

FIG. 2 is a diagrammatical view when looking, from above, inside of the granulation tank 7 of the granulator shown in FIG. 1.

In FIG. 2, numerals 2 to 6 are the same as above. An arrow 8 represents a rotational direction of the agitator 4, an arrow 9 represents a rotational direction of the side plate 3, and an arrow 10 represents the flow of the PTFE powder.

As is evident from FIG. 2, the side plate 3 and agitator 4 are designed based on the theory of reverse flow so that the respective rotational directions 9 and 8 become opposite to each other, thereby advancing the granulation while the PTFE powder particles are rubbed with each other.

The specific granulator used in the present invention has such a structure as mentioned above and differs from a conventional granulator which granulates by simple tumbling. The granulator used in the present invention is excellent in that since particularly the disc 2 is inclined as mentioned above, only coarse particles can be pulverized. Also when poured in the granulator, the PTFE powder is pressed onto the side plate 3 by a centrifugal force of the rotating disc 2 and the flow of the powder is changed by the agitator 4 and the wall scraper 6 and dispersed. The flows of the respective powders cross with each other it high speed, and particularly when there exists a filler, the powders are highly dispersed, mixed and granulated.

In FIG. 1, by steam-heating a jacket, a temperature of a product in the granulation tank 7 can be maintained at a temperature in the range of room temperature to 100° C.

The PTFE powder used in the present invention is prepared by usual suspension polymerization, and preferable is, for example, a powder comprising homopolymer of tetrafluoroethylene (TFE) or a copolymer of TFE and a monomer copolymerizable TFE. An average particle size after pulverization is not larger than 200 μm, preferably not larger than 50 μm, and a lower limit thereof is defined by a pulverizing apparatus and pulverizing technique. Examples of the pulverizer used in the above-mentioned pulverization are, for instance, a hammer mill, a grinder having a rotor with blades, a jet mill and an impact mill.

As the monomer copolymerizable with TFE, there are, for example, a per(fluoro vinyl ether) represented by the formula (I):

$$CF_2=CF-OR_f \qquad (I)$$

wherein $R_f$ is a perfluoroalkyl group having 1 to 10 carbon atoms, a perfluoro(alkoxyalkyl) group having 4 to 9 carbon atoms, an organic group represented by the formula (II):

(II)

in which m is 0 or an integer of 1 to 4, or an organic group represented by the formula (III):

(III)

in which n is an integer of 1 to 4, and the like.

The number of carbon atoms of the above-mentioned perfluoroalkyl group is from 1 to 10, preferably from 1 to 5. When the number of carbon atoms is within the above-mentioned range, an excellent creep resistance can be obtained with maintaining the property of being not-meltprocessable.

As the above-mentioned perfluoroalkyl group, there are, for example, perfluoromethyl, perfluoroethyl, perfluoropropyl, perfluorobutyl, perfluoropentyl, perfluorohexyl and the like. From the viewpoint of creep resistance and cost of monomer, perfluoropropyl is preferable.

When a proportion of the monomer copolymerizable with TFE is within the range of 1.0 to 0.001% by mole, an excellent creep resistance of a molded article obtained from the granular powder can be improved.

As the surfactant which c an be used in the present invention, there are, for example, a nonionic surfactant, an anionic surfactant and the like.

Examples of the above-mentioned nonionic surfactant are, for instance, polyoxyethylamine oxides, alkylamine oxides, polyoxyethylene alkyl ethers, polyoxyethylene alkyl phenyl ethers, polyoxyethylene fatty acid esters, sorbitan fatty acid esters, polyoxyethylene sorbitan fatty acid esters, glycerine esters, polyoxyethylene alkylamine, the derivatives thereof, and the like.

More particularly, examples of the polyoxyethylamine oxides are dimethyloxyethylamine oxide and the like.

Examples of the alkylamine oxides are dimethyllaurylamine oxide, dimethyloleylamine oxide and the like.

Examples of the polyoxyethylene alkyl ethers are polyoxyethylene lauryl ether, polyoxyethylene cetyl ether, polyoxyethylene stearyl ether, polyoxyethylene oleyl ether, polyoxyethylene behenyl ether and the like.

Examples of the polyoxyethylene alkyl phenyl ethers are polyoxyethylene nonyl phenyl ether, polyoxyethylene octyl phenyl ether and the like.

Examples of the polyoxyethylene fatty acid esters are polyoxyethylene monolauric acid ester, polyoxyethylene monooleic acid ester, polyoxyethylene monostearic acid ester and the like.

Examples of the sorbitan fatty acid esters are sorbitan monolauric acid ester, sorbitan monopalmitic acid ester, sorbitan monostearic acid ester, sorbitan monooleic acid ester and the like.

Examples of the polyoxyethylene sorbitan fatty acid esters are polyoxyethylene sorbitan monolauric acid ester, polyoxyethylene sorbitan monopalmitic acid ester, polyoxyethylene sorbitan monostearic acid ester and the like.

Examples of the glycerine esters are monomyristic acid glyceryl, monostearic acid glyceryl, monooleic acid glyceryl and the like.

Examples of the derivatives of the above surfactants are, for example, polyoxyethylene alkyl phenyl-formaldehyde condensate, polyoxyethylene alkyl ether phosphate and the like.

Among them, preferable are the amine oxides and the polyoxyethylene alkyl phenyl ethers, and more preferable are polyoxyethylene nonyl phenyl ether, polyoxyethylene octyl phenyl ether and polyoxyethylamine oxide.

As the anionic surfactant, there can be used known ones, for example, higher fatty acid and its salt, alkyl sulfate, alkyl sulfonate, alkyl aryl sulfonate, alkyl phosphoric acid ester and the like. Particularly preferable anionic surfactants are a sulfate of higher alkyl alcohol, for example, sodium lauryl sulfate or a fluorine-containing sulfonic acid type- or carboxylic acid type-anionic surfactant having a fluoroalkyl group or chlorofluoroalkyl group. The typical compounds thereof are those represented by the formula (IV):

$$X(CF_2CF_2)_n(CH_2)_mA \qquad (IV)$$

or the formula (V):

$$X(CF_2CFCl)_n(CH_2)_mA \qquad (V)$$

wherein X is hydrogen, fluorine atom or chlorine atom, n is an integer of 3 to 10, m is 0 or an integer of 1 to 4, A is carboxyl group, sulfonic acid group or an alkali metal or ammonium residue thereof. Examples of preferred anionic surfactant are sodium tetradecene sulfonate and ammonium perfluorooctanate.

An amount of the above-mentioned surfactant is preferably from 0.3 to 4% by weight on the basis of the PTFE powder.

In the present invention, the meaning of the wetting encompasses such a state that the PTFE powder gets wet by adding, thereto, an aqueous solution containing a surfactant and does not separate from the aqueous solution containing a surfactant. It is preferable that the amount of the aqueous solution containing a surfacatnt in the above-mentioned concentration is 30 to 60 parts (part by weight, hereinafter the same) based on 100 parts of the PTFE powder.

In the present invention, the tumbling may be carried out after charging the PTFE powder wetted with the aqueous solution containing a surfactant in the granulator or after charging the PTFE powder and then the surfactant in the granulator.

In the present invention, a filler can be used. In case where a hydrophilic filler is used, there is a drawback such that the filler is difficult to be mixed with the PTFE powder homogeneously clue to its hydrophilic property, that is, the agglomerated powder in which the whole of the filler used is mixed with the PTFE powder cannot be obtained. This phenomenon is so-called the separation of filler.

To cope with this problem, there is employed a method of previously surface-treating a hydrophilic filler for making it hydrophobic to lower its surface activity near the surface activity of the PTFE powder and then mixing the filler with the PTFE powder.

As the known compound used for the above-mentioned surface treatment, there are (a) a functional amino-containing silane and/or a soluble silicone (JP-A-51-548, JP-A-51-549, JP-A-4-218534), (b) a monocarboxylic acid of hydrocarbon having 12 to 20 carbon atoms (JP-B-48-37576), (c) a chromium complex compound of an aliphatic carboxylic acid (JP-B-48-37576), (d) a silicone (JP-A-53-139660), etc. and (e) a method of coating a hydrophilic filler with PTFE, (JP-A-51-121417) is also known.

Examples of the above-mentioned compound used for the surface treatment of the hydrophilic filler are, for instance, aminosilane coupling agents such as γ-aminopropyltriethoxysilane ($H_2N(CH_2)_3Si(OC_2H_5)_3$), m- or p-aminophenyltriethoxysilane ($H_2N—C_6H_4—Si(OC_2H_5)_3$), γ-ureidopropyltriethoxysilane ($H_2NCONH(CH_2)_3Si(OC_2H_5)_3$), N-(β-aminoethyl)-γ-aminopropyltrimethoxysilane ($H_2N(CH_2)_2NH(CH_2)_3Si(OCH_3)_3$) and N-(β-aminoethyl)-γ-aminopropylmethyldimethoxysilane ($H_2N(CH_2)_2NH(CH_2)_3SiCH_3(OCH_3)_2$), and the like. In addition to those compounds, there are, for example, organosilane compounds such as phenyltrimethoxysilane, phenyltriethoxysilane, p-bromomethylphenyltrimethoxysilane, diphenyldimethoxysilane, diphenyldiethoxysilane and diphenylsilanediol.

A filler having water-repelling property can be used as it is.

Examples of the above-mentioned filler are, for instance, one or more of metal fiber powder or metal powders such as glass fiber powder, graphite powder, bronze powder, gold powder, silver powder, copper powder, stainless steel powder, stainless steel fiber powder, nickel powder and nickel fiber powder; inorganic fiber powder or inorganic powders such as molybdenum disulfide powder, fluorinated mica powder, coke powder, carbon fiber powder, boron nitride powder and carbon black; organic powders such as heat-resistive aromatic resin powder, e.g. polyoxybenzoyl polyester, polyimide powder, tetrafluoroethylene-perfluoro (alkyl vinyl ether) copolymer (PFA) powder and polyphenylene sulfide powder; and the like. The filler is not limited thereto.

In case where two or more fillers are used, preferable combination is, for example, glass fiber powder and graphite powder, glass fiber powder and molybdenum disulfide powder, bronze powder and molybdenum disulfide powder, bronze powder and carbon fiber powder, graphite powder and coke powder, graphite powder and heat-resistive aromatic resin powder, carbon fiber powder and heat-resistive aromatic resin powder or the like. The mixing method may be either of wet method or dry method.

It is preferable that the above-mentioned filler has an average particle size or an average fiber length of 10 to 1,000 μm.

It is preferable that the proportion of the PTFE powder and the filler is 5 to 40 parts of the filler on the basis of 100 parts of the PTFE powder.

In the present invention, there is, for example, the following preparation process.

The 6-liter granulator having a rotating disc and a rotating side plate (angle of the disc to a horizontal level: 30 degrees) was charged with 1,140 to 720 g of a PTFE powder and 60 to 480 kg of a filler. While rotating the disc, side plate and agitator at 500 to 1,000 rpm, respectively and further the agitator at 3,000 to 5,000 rpm, the powder and filler are mixed uniformly for five minutes.

Then 360 to 720 ml of an aqueous solution containing 0.3 to 4% by weight of a surfactant is added over 10 to 30 seconds. While maintaining the above-mentioned number of rotations, the aqueous solution containing a surfactant is made compatible with the mixture over 0.5 to 3 minutes.

Subsequently, the number of rotations of the disc and side plate is adjusted to 500 to 1,000 rpm, the number of rotations of the agitator is maintained at 0 to 450 rpm, and a jacket is steam-heated to heat a product in the granulator to 70° to 75° C. for 10 to 30 minutes, followed by granulating the product by tumbling for 0 to 30 minutes.

Then the product is taken out and dried at 165° C. for 16 hours in an electric oven to give a PTFE granular powder for molding of the present invention.

In such a preparation process as mentioned above, a PTFE granular powder for molding which gives the following physical properties of the powder and molded article can be obtained.

Apparent density: not less than 0.6 g/ml
Flowability: 6 times
Particle size distribution: Granular powder remaining on a 10 mesh sieve 0 to 5%
Average particle size: 400 to 1,000 μm
Tensile strength: not less than 150 to 400 kgf/cm$^2$
Elongation: 100 to 500%
Electrostatic charge: not more than 50 V Examples of conditions for the process for preparing a PTFE granular powder for molding of the present invention are as follows.

(1)

| | |
|---|---|
| (A) PTFE powder | 100 parts |
| (C) Surfactant (on the basis of the PTFE powder) | 0.3 to 4% by weight |
| (D) Number of rotations of a disc | 500 to 1,000 rpm |
| Number of rotations of a side plate | 500 to 1,000 rpm |
| Angle of the disc to a horizontal level | 10 to 40 degrees |

These conditions are advantageous from the viewpoint of flowability.

More preferable conditions are:

| | |
|---|---|
| (A) PTFE powder | 100 parts |
| (C) Surfactant (on the basis of the PTFE powder) | 0.3 to 1.0% by weight |
| (D) Number of rotations of a disc | 800 to 1,000 rpm |
| Number of rotations of a side plate | 800 to 1,000 rpm |
| Angle of the disc to a horizontal level | 20 to 40 degrees |

These conditions are excellent from the viewpoints of apparent density and particle size distribution.

(2)

| | |
|---|---|
| (A) PTFE powder | 100 parts |
| (B) Filler | 5 to 40 parts |
| (C) Surfactant (on the basis of a sum of (A) and (B)) | 0.3 to 4% by weight |
| (D) Number of rotations of a disc | 500 to 1,000 rpm |
| Number of rotations of a side plate | 500 to 1,000 rpm |
| Angle of the disc to a horizontal level | 10 to 40 degrees |

These conditions are advantageous from the viewpoint of flowability.

More preferable conditions are:

| | |
|---|---|
| (A) PTFE powder | 100 parts |
| (B) Filler | 10 to 30 parts |
| (C) Surfactant (on the basis of a sum of (A) and (B)) | 0.3 to 1.0% by weight |
| (D) Number of rotations of a disc | 800 to 1,000 rpm |
| Number of rotations of a side plate | 800 to 1,000 rpm |
| Angle of the disc to a horizontal level | 20 to 30 degrees |

These conditions are excellent from the viewpoints of apparent density and particle size distribution.

EXAMPLE

The present invention is then explained in detail by means of Experimental Examples, but is not limited to them.

Experimental Examples 1 and 2

A 6-liter granulator having a rotating disc and a rotating side plate (Elrich Reverse Flow Type High Speed Mixer Model R02 available from Nippon Irich Co., Ltd., angle of a bottom disc to a horizontal level: 30 degrees) was charged with 1,080 g of a PTFE powder (POLYFLON M-111 available from Daikin Industries, Ltd., modified PTFE, in which 0.1% by mole of perfluoro(propyl vinyl ether) was copolymerized, average particle size after pulverizing: 25 μm) and 120 g of a carbon fiber powder (pitch type carbon fiber SG-249 available from Osaka Gas Chemical Kabushiki Kaisha). While rotating the both of the disc and side plate at 1,000 rpm, respectively and the agitator at 4,800 rpm, the powder and filler are mixed uniformly for five minutes.

Then an aqueous solution containing a surfactant shown in Table 1 was added in an amount shown in Table 1, and while maintaining the above-mentioned number of rotations, the aqueous solution containing a surfactant was made compatible with the mixture for five minutes.

Subsequently while maintaining the number of rotations of the disc and side plate at 1,000 rpm and the number of rotations of the agitator at 450 rpm, a jacket was steam-heated to heat a product in the granulator to 75° C. for granulation.

Then the product was taken out and dried at 165° C. for 16 hours in an electric oven to give a PTFE granular powder for molding. After measuring a weight of the granular powder (hereinafter referred to as "obtained weight"), the following tests were carried out.

Apparent density: Measured in accordance with JIS K 6891-5.3.

Average particle size after pulverization (Primary particle size):

Wet sieve method: JIS standard sieves of 20 mesh (sieve opening: 840 μm), 250 mesh (sieve opening: 62 μm), 270 mesh (sieve opening: 53 μm), 325 mesh (sieve opening: 44 μm) and 400 mesh (sieve opening: 37 μm) are used. First, the 20 mesh sieve is placed on the 250 mesh sieve, and 5 g of a sample powder is put on the 20 mesh sieve. By spraying carbon tetrachloride carefully with a sprayer at a rate of about 3 liters/m$^2$ for about 30 seconds, the powder is rinsed on the lower sieve. When the sample powder has been rinsed completely, the upper sieve is removed and spraying all over the lower sieve is conducted for about four minutes. After that, the lower sieve is air-dried and a weight of the dried powder remaining thereon is measured. A series of the above-mentioned steps are repeated by using the 20 mesh sieve and each of the other three sieves of smaller meshes, respectively, and 5 g each of new sample powder is used. In order to obtain an accumulated weight percentage, the weights of the powder remaining on each sieve are multiplied by 20 and then those obtained values are plotted on a logarithmic probability paper to openings of each sieve. Those plotted points are connected with a line, particle sizes corresponding to the accumulated percentages 50($d_{50}$) and 84($d_{34}$) are read, and wet sieve size ($d_{ws}$) is calculated by the following equation.

$$\log_e d_{ws} = \log_e d_{50} - \frac{1}{2}\left(\log_e \frac{d_{34}}{d_{50}}\right)^2$$

Flowability: According to the method described in JP-A-3-259925, the granular powder was filled in a hopper and dropped by opening an outlet of the hopper. This was repeated to determine how many times the powder drops spontaneously.

Average particle size and particle size distribution of granular powder:

Standard sieves of 10, 20, 32, 48 and 60 meshes (inch mesh) are placed in that order from the top, and PTFE granular powder is put on the 10 mesh sieve. The sieves are vibrated to drop smaller particles downward through each sieve in order. Then after the ratio of the powder remaining on each sieve is obtained by %, accumulated percentages (ordinate) of each remaining powder to the openings of each sieve (abscissa) are plotted on the logarithmic probability paper, and those points are connected with a line. The particle size, the proportion of which is 50% on that line, is obtained and is regarded as an average particle size.

Yield: A ratio of the obtained weight to the sum of the PTFE powder and filler which were charged in the granulator was represented by a weight percentage.

Tensile strength (hereinafter may be referred to as "TS") and elongation (hereinafter may be referred to as "EL"):

A die having an inner diameter of 100 mm is charged with 25 g of powder, and a pressure is applied gradually over about 30 seconds until the final pressure becomes about 500 kg/cm$^2$. Then that pressure is kept for two minutes to give a pre-molded article. The pre-molded article is taken out of the die mold and put in an electric oven being kept at 365° C. to be subjected to sintering for three hours. Then the sintered article is punched with a JIS dumbbell No. 3 to give a sample. A stress at break and elongation of the sample are measured in accordance with JIS K 6891-58 by stretching at a stretching rate of 200 mm/min with an autograph having a gross weight of 500 kg.

Electrostatic charge: Handy Electrostatic Meter SFM775 available from Ion Systems, Inc. is used to determine an electrostatic charge.

The results are shown in Table 1.

Experimental Examples 3 and 4

A PTFE granular powder for molding was prepared in the same manner as in Experimental Example 1 except that 1,020 g of the PTFE powder was used, 180 g of a glass fiber powder (EPG40M-10A available from Nippon Denki Glass Kabushiki Kaisha, average diameter: 12 μm, average fiber length: 80 μm) was used instead of the carbon fiber powder, and kind, concentration and amount of surfactants shown in Table 1 were used. After an obtained weight was measured, the tests were carried out in the same manner as in Experimental Example 1. The results are shown in Table 1.

Experimental Examples 5 and 6

First, the granulator used in the Experimental Examples 5 and 6 is explained below.

Figure 3:
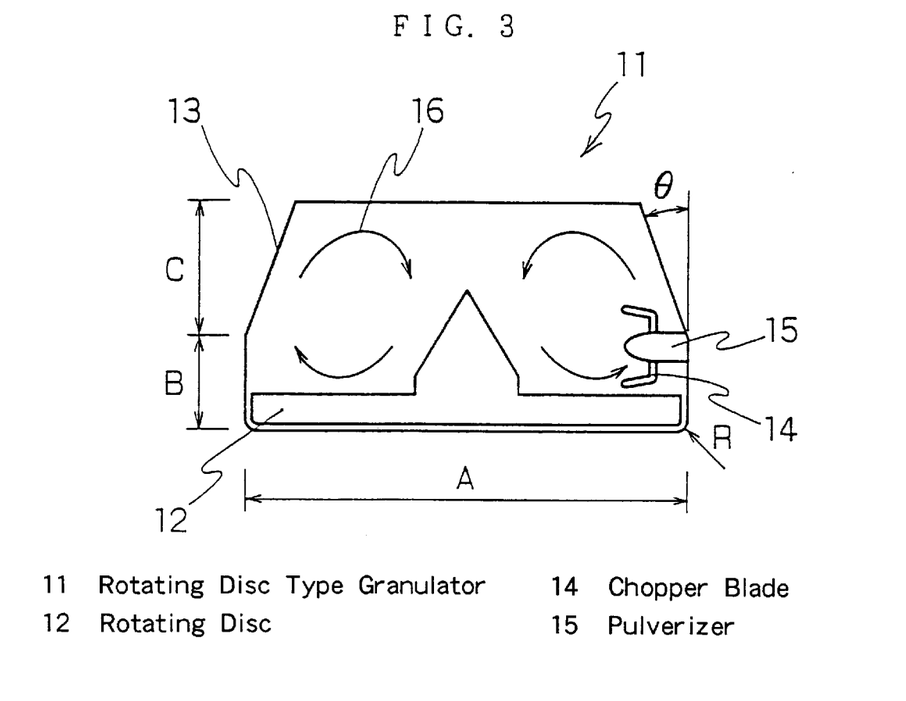
FIG. 3 is a cross-sectional view of the rotating disc type granulator, which is used in Experimental Examples 5 to 8.
Figure 4:
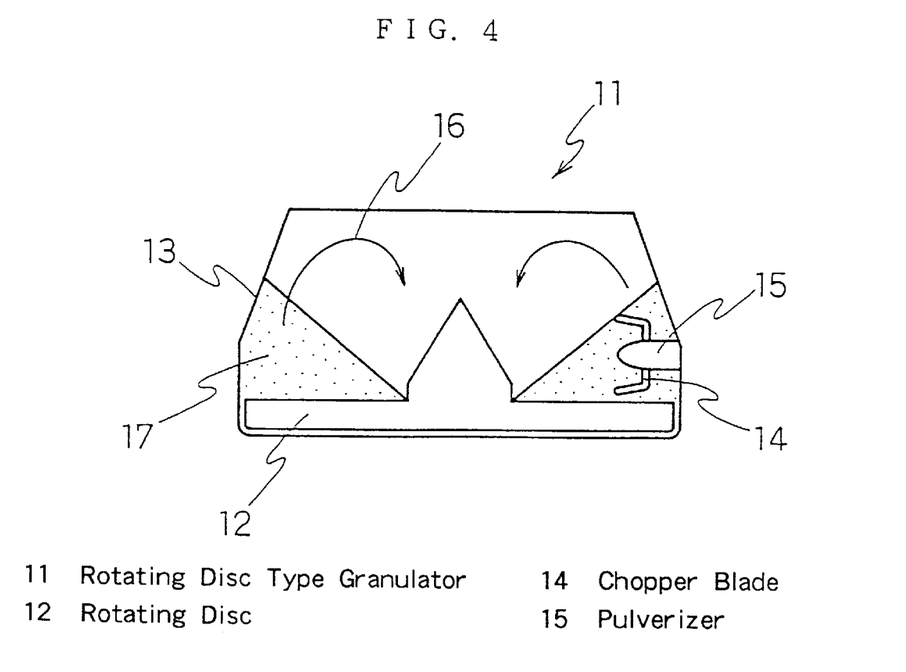
FIG. 4 is a cross-sectional view of the rotating disc type granulator, which is used in Experimental Examples 5 to 8.

FIGS. 3 and 4 are diagrammatical sectional views for explaining a rotating disc type granulator (High Speed Mixer Model FS-10 available from Fukae Kogyo Kabushiki Kaisha) which is the granulator used in these Experimental Examples.

In FIG. 3, numeral 11 represents the rotating disc type granulator which comprises a rotating disc 12, a side plate 13 and a pulverizer 15 with chopper blades 14. The side plate 13 comprises a portion B being at a right angle to the rotating disc 12 and a conical portion C being inclined inward at an angle of θ. Well-balanced design of these components can make smooth a flow 16 of a PTFE powder containing a filler.

The position and size of the pulverizer 15 have a great effect on mixing, tumbling and granulation of the PTFE powder and filler. The chopper blades 14 are located at a distance of 2 to 3 mm from the rotating disc 12 when being nearest to the disc. All the powders dispersed along the vessel strike on the chopper blades 14 so that irregular agglomerates produced at the time of granulating can be pulverized.

When the granulation is carried out by adding a liquid, since the particle size of the granulated powder is determined by the number of rotations of the chopper blades 14, the chopper blades are of non-stage transmission type using an inverter.

When the rotation of the rotating disc is constant, there is no problem with the number of rotations. The number of rotations may be selected properly so that the flow 16 of the PTFE powder containing the filler is in the best condition as shown in FIG. 4.

In FIG. 4, numerals 11 to 16 are the same as in FIG. 3. Numeral 17 represents the PTFE powder containing the filler.

A peripheral speed of the rotating disc 12 varies depending on kind of the PTFE powder. About 5 to 10 m/second is suitable.

In these Experimental Examples, first, the above-mentioned 10-liter rotating disc type granulator was charged with 1,080 g of a PTFE powder (POLYFLON M-111 available from Daikin Industries, Ltd. modified PTFE, in which 0.1% by mole of perfluoro(propyl vinyl ether) was copolymerized, average particle size after pulverizing: 25 μm) and 120 g of a carbon fiber powder (pitch type carbon fiber SG-249 available from Osaka Gas Chemical Kabushiki Kaisha), followed by mixing uniformly for five minutes while rotating the rotating disc and pulverizer at 800 rpm and 4,600 rpm, respectively.

Then while rotating the rotating disc and pulverizer at the respective number of rotations mentioned above, an aqueous solution containing a surfactant, the kind, concentration and amount of which are shown in Table 1, was added over 30 seconds. Further for five minutes, the aqueous solution containing a surfactant is made compatible with the PTFE powder and filler.

Subsequently while rotating the rotating disc and pulverizer at 200 rpm and 50 rpm, respectively, a jacket of the rotating disc type granulator was steam-heated to heat a product in the granulator to around 70° C. over 20 minutes for granulation of the product.

Then the product was taken out, and dried at 165° C. for 16 hours in an electric oven to give a PTFE granular powder for molding. After an obtained weight was measured, the tests were carried out in the same manner as in Experimental Example 1. The results are shown in Table 1.

Experimental Examples 7 and 8

A PTFE granular powder for molding was prepared in the same manner as in Experimental Example 5 except that 6-liter rotating disc type granulator as mentioned above was used, 1,020 g of the PTFE powder was used, 180 g of a glass fiber powder (EPG40M-10A available from Nippon Denki Glass Kabushiki Kaisha, average diameter: 12 μm, average fiber length: 80 μm) instead of the carbon fiber powder, and kind, concentration and amount of a surfactant shown in Table 1 were used. After an obtained weight was measured, the tests were carried out in the same manner as in Experimental Example 1. The results are shown in Table 1.

TABLE 1

| | Experimental Examples | | | | | | | |
|---|---|---|---|---|---|---|---|---|
| | 1 | 2 | 3 | 4 | 5 | 6 | 7 | 8 |
| Kind of filler | Carbon fiber powder | Carbon fiber powder | Glass fiber powder | Glass fiber powder | Carbon fiber powder | Carbon fiber powder | Glass fiber powder | Glass fiber powder |
| Surfactant | | | | | | | | |
| Kind | SOS | SOS | DS-101 | DS-101 | SOS | SOS | DS-101 | DS-101 |
| Concentration in aqueous solution: (% by weight) | 0.75 | 1.00 | 0.50 | 1.00 | 0.75 | 1.00 | 0.50 | 1.00 |
| Amount of aqueous solution (ml) | 480 | 480 | 480 | 480 | 480 | 480 | 480 | 480 |
| Content in aqueous solution (g) | 3.6 | 4.8 | 2.4 | 4.8 | 3.6 | 4.8 | 2.4 | 4.8 |
| Apparent density (g/ml) | 0.745 | 0.805 | 0.843 | 0.863 | 0.710 | 0.750 | 0.812 | 0.832 |
| Flowability (times) | 8 | 8 | 8 | 8 | 8 | 3 | 8 | 8 |
| Particle size distribution (% by weight) | | | | | | | | |
| 10 on | 2.9 | 2.4 | 1.8 | 0.2 | 16.8 | 18.0 | 4.1 | 4.7 |
| 20 on | 12.8 | 30.2 | 26.8 | 23.3 | 20.4 | 21.0 | 23.5 | 27.0 |
| 32 on | 36.5 | 55.2 | 43.3 | 43.4 | 43.5 | 43.8 | 48.2 | 54.4 |
| 48 on | 34.1 | 10.9 | 22.9 | 26.2 | 18.5 | 16.6 | 22.9 | 12.2 |
| 60 on | 11.1 | 0.6 | 5.3 | 6.8 | 0.8 | 0.7 | 0.9 | 0.7 |
| 60 pass | 2.2 | 0.6 | 0.0 | 0.0 | 0.0 | 0.0 | 0.5 | 0.6 |
| Average particle size of granulated PTFE powder ($\mu$m) | 520 | 740 | 670 | 630 | 740 | 760 | 680 | 730 |
| Obtained weight (g) | 1173 | 1180 | 1178 | 1188 | 923 | 956 | 992 | 1005 |
| Yield (% by weight) | 97.8 | 98.3 | 98.2 | 99.0 | 76.9 | 79.7 | 82.7 | 83.8 |
| TS (kgf/cm$^2$) | 195 | 196 | 212 | 211 | 192 | 197 | 206 | 210 |
| EL (%) | 284 | 285 | 301 | 304 | 282 | 283 | 296 | 290 |
| Electrostatic charge (V) | 0 | 0 | 20 | 10 | 10 | 0 | 20 | 10 |

In Table 1, abbreviations representing kinds of surfactants are as follows.
SOS: Sodium tetradecene sulfonate
DS-101: Ammonium perfluorooctanate In the column of the particle size distribution in Table 1, 10 on, 20 on, 32 on, 48 on and 60 on represents the percentage of particles remaining on the 10 mesh, 20 mesh, 32 mesh, 48 mesh and 60 mesh sieves, respectively. And 60 pass represents the percentage of the particles which passed through the 60 mesh sieve.

As is evident from the results in Table 1, the process for preparing a PTFE granular powder for molding by using a specific granulator gives a high yield, and the number of coarse particles contained in an obtained granular powder is small.

INDUSTRIAL APPLICABILITY

The PTFE granular powder for molding of the present invention contains only a small number of coarse particles and has a good particle size distribution.

Further in the process for preparing a PTFE granular powder for molding of the present invention, since not only the disc but also the side plate rotate, a tumbling efficiency is high, and because powders do not adhere to inner surfaces of the granulator, yield is high. Also since the disc is inclined to a horizontal level, only coarse particles can be pulverized and a granular powder having good particle size distribution can be obtained. Further since an organic liquid is not required to be used, equipment cost is low and there is no adverse effect on human body and environment.

We claim:

1. A process for preparing a polytetrafluoroethylene granular powder for molding by granulating a polytetrafluoroethylene powder through tumbling with a granulator having a rotating inclined disc and a rotating side plate; wherein the granulator:

(1) comprises a disc inclined to the horizontal level and a side plate provided on the periphery of the disc,
    (2) has the side plate assembled in one unit with the disc and rotating together, and
    (3) is equipped with an agitator positioned eccentrically to the center of a vortex of the polytetrafluoroethylene powder which is caused by tumbling, and that the granulation is carried out by tumbling the polytetrafluoroethylene powder wetted with an aqueous solution containing a surfactant.

2. A process for preparing a polytetrafluoroethylene granular powder for molding by granulating a polytetrafluoroethylene powder through tumbling with a granulator having a rotating disc and a rotating side plate; wherein the granulator:

(1) comprises a disc inclined to a horizontal level and a side plate provided on the periphery of the disc,
    (2) has the side plate separated from the disc and being rotatable around the periphery of the disc, and
    (3) is equipped with an agitator positioned eccentrically to the center of a vortex of the polytetrafluoroethylene powder which is caused by tumbling, and that the granulation is carried out by tumbling the polytetrafluoroethylene powder wetted with an aqueous solution containing a surfactant.

3. The process for preparing a polytetrafluoroethylene granular powder for molding of claim 1, wherein the granulation is carried out by tumbling the polytetrafluoroethylene powder and a filler which are wetted with an aqueous solution containing a surfactant.

4. The process for preparing a polytetrafluoroethylene granular powder for molding of claim 3, wherein the surfactant is an anionic surfactant.

5. The process for preparing a polytetrafluoroethylene granular powder for molding of claim 4, wherein the anionic surfactant is sodium tetradecene sulfonate or ammonium perfluorooctanate.

6. The process for preparing a polytetrafluoroethylene granular powder for molding of claim 1, wherein the polytetrafluoroethylene is a modified polytetrafluoroethylene prepared by copolymerizing 99 to 99.999% by mole of tetrafluoroethylene and 1 to 0.001% by mole of perfluoro (vinyl ether) represented by the formula (I):

wherein $R_f$ is a perfluoroalkyl group having 1 to 10 carbon atoms, a perfluoro(alkoxyalkyl) group having 4 to 9 carbon atoms, an organic group represented by the formula (II):

wherein m is 0 or an integer of 1 to 4, or an organic group represented by the formula (III):

wherein n is an integer of 1 to 4.

7. A polytetrafluoroethylene granular powder for molding which is prepared by the process of claim 1.

8. The polytetrafluoroethylene granular powder for molding of claim 7, wherein an apparent density of the granular powder is not less than 0.6 g/ml.

9. The polytetrafluoroethylene granular powder for molding of claim 7, wherein flowability of the granular powder is not less than 6 times.

10. The polytetrafluoroethylene granular powder for molding of claim 7, wherein an average particle size of particles in the granular powder is from 400 to 1,000 μm.

11. The polytetrafluoroethylene granular powder for molding of claim 7, wherein electrostatic charge of the granular powder is not more than 50 V.

12. The process for preparing a polytetrafluoroethylene granular powder for molding of claim 2, wherein the granulation is carried out by tumbling the polytetrafluoroethylene powder and a filler which are wetted with an aqueous solution containing a surfactant.

13. The process for preparing a polytetrafluoroethylene granular powder for molding of claim 12, wherein the surfactant is an anionic surfactant.

14. The process for preparing a polytetrafluoroethylene granular powder for molding of claim 13, wherein the anionic surfactant is sodium tetradecene sulfonate or ammonium perfluorooctanate.

15. The process for preparing a polytetrafluoroethylene granular powder for molding of claim 2, wherein the polytetrafluoroethylene is a modified polytetrafluoroethylene prepared by copolymerizing 99 to 99.999% by mole of tetrafluoroethylene and 1 to 0.001% by mole of perfluoro (vinyl ether) represented by the formula (I):

wherein $R_f$ is a perfluoroalkyl group having 1 to 10 carbon atoms, a perfluoro(alkoxyalkyl) group having 4 to 9 carbon atoms, an organic group represented by the formula (II):

wherein m is 0 or an integer of 1 to 4, or an organic group represented by the formula (III):

wherein n is an integer of 1 to 4.

16. A polytetrafluoroethylene granular powder for molding which is prepared by the process of claim 2.

17. The polytetrafluoroethylene granular powder for molding of claim 16, wherein an apparent density of the granular powder is not less than 0.6 g/ml.

18. The polytetrafluoroethylene granular powder for molding of claim 16, wherein flowability of the granular powder is not less than 6 times.

19. The polytetrafluoroethylene granular powder for molding of claim 16, wherein an average particle size of particles in the granular powder is from 400 to 1,000 μm.

20. The polytetrafluoroethylene granular powder for molding of claim 16, wherein electrostatic charge of the granular powder is not more than 50 V.

* * * * *